United States Patent
Meyer et al.

(10) Patent No.: US 6,413,905 B1
(45) Date of Patent: Jul. 2, 2002

(54) SUPPORTED CATALYST AND ITS USE IN HYDROGENATION

(75) Inventors: Gerald Meyer, Ludwigshafen; Ekkehard Schwab, Neustadt; Helmut Landes; Helmut Knözinger, both of München, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/441,552

(22) Filed: Nov. 17, 1999

(30) Foreign Application Priority Data

Nov. 26, 1998 (DE) .......................... 198 54 635

(51) Int. Cl.$^7$ .......................... B01J 21/06; B01J 21/08; B01J 23/42; B01J 23/44
(52) U.S. Cl. ........................ 502/339; 502/350
(58) Field of Search ............... 502/344, 324, 502/325, 339, 349, 350, 353, 305

(56) References Cited

U.S. PATENT DOCUMENTS

| | | | | |
|---|---|---|---|---|
| 4,400,306 A | * | 8/1983 | Dria et al. | |
| 5,145,825 A | * | 9/1992 | Deeba et al. | |
| 5,569,803 A | * | 10/1996 | Takewaki et al. | |
| 5,639,927 A | * | 6/1997 | Suzuki et al. | |
| 5,780,382 A | * | 7/1998 | Chang et al. | |
| 5,849,256 A | * | 12/1998 | Deeba et al. | |
| 6,030,921 A | * | 2/2000 | Ziemer | |

FOREIGN PATENT DOCUMENTS

EP  225 953  6/1987

OTHER PUBLICATIONS

Applied Surface Sci., 33/34 (1988) 269–276, Matsuo et al.
Applied Catalysis, 63, (1990) 37–50, Alekseev et al.
La Chimica E L'Industria, V. 65, N. 11, Nov. 1983 Carturan et al.

* cited by examiner

Primary Examiner—Steven P. Griffin
Assistant Examiner—Christina Ildebrando
(74) Attorney, Agent, or Firm—Keil & Weinkauf

(57) ABSTRACT

A supported catalyst comprising a catalytically active metal and a support modified by application of modifiers to an inner support material is produced by applying the catalytically active metal in the form of its chloride-free dissolved amine complexes, acetylacetonate complexes or allyl complexes to the modified support. A process for producing this supported catalyst and a process for the catalytic hydrogenation of unsaturated compounds using this supported catalyst are also provided.

12 Claims, No Drawings

SUPPORTED CATALYST AND ITS USE IN HYDROGENATION

The present invention relates to supported catalysts made up of modified supports and an active component, their production and their use in the hydrogenation of unsaturated compounds.

Supported catalysts, in particular supported oxides, play an important role in catalysis. A study of adsorbed $O_2$ indicates that oxides supported on diamagnetic support materials are sometimes enriched in less electron-rich oxygen species such as $O_2^-$ and $O^-$ because their surface has only a low density of electron-donating centers. Since selective oxidation of organic molecules requires that only a limited amount of active $O_2$ is made available, numerous mixed and supported oxides are employed here. Since their surfaces also have various adsorption sites, the modification of supports by application of further components (hereinafter referred to as modifiers) enables activity and selectivity of the catalysts to be influenced over wide ranges.

The support materials can interact with the active metal. Such interactions of the metals with reducible oxides resulting from high reduction temperatures (over 700 K) are generally referred to as strong metal-support interactions (SMSI). A description of SMSI assumes that ions of the support oxide migrate to the surface of the reduced metal at high reduction temperatures. Such modifiers enable the activity of the catalyst in various reactions to be increased. The increased activity is generally attributed to the active component being highly dispersed. In addition, the catalysts have a high sintering and agglomeration stability.

Carturan, G. Chim. Int. (Milan) 65 (1983) 688, describes the hydrogenation of polyunsaturated $C_{18}$-fatty acids using palladium catalysts. One of the catalysts used comprises a support of glass beads which are coated with $TiO_2$. The $TiO_2$ is applied from an ethanolic $Ti(OEt)_4$ solution, followed by heating to 400° C. The modification of the support material is carried out here by pretreating the shaped body, namely the glass beads, with a precursor compound of the modifier.

Ryndin et al., Applied Catalysis, 63 (1990) 37 to 50, describe a study of the influence of group IVB ions on the adsorption and the catalytic properties as well as the dispersion of the active metal in the system $Pd/SiO_2$. The catalyst system is produced from dehydrated $SiO_2$ and tetrabenzyltitanium, tetrabenzylzirconium or tetrabenzylhafnium and subsequent adsorption of allyl (cyclopentadienyl)palladium. During production of the catalyst, air is excluded completely. The synthesis of MeOH from CO and $H_2$ and the hydrogenation of benzene in the presence of the catalyst are studied.

EP-A 0 225 953 discloses catalysts comprising a metal alkoxide-modified support and a catalytically active metal of transition group VIII of the Periodic Table of the Elements. In the examples, the only support material used is $\gamma$-$Al_2O_3$ which has been modified with a metal alkoxide. The application of the catalytically active metals is carried out exclusively by impregnation with a solution of their chlorides or nitrates. The catalysts display increased activity in the disproportionation of alkenes, in a gas-phase process for preparing $\alpha$-substituted acrylate esters or methyl methacrylates, in processes for the selective hydrogenation of hydrocarbons having at least one alkene and one alkyne unit, where the alkyne is hydrogenated without hydrogenation of the alkene, and in a process for preparing methane from CO and $H_2$.

K. Matsuo et al. Appl. Surf., pages 33, 34 (1998), 269–276, describe catalysts comprising a titanium-coated silica support in which metals of the Pt group are present as active component. The $Ti/SiO_2$ support can be produced by various methods:
a) Gas-phase hydrogenation of titanium alkoxides and adsorption on $SiO_2$;
b) Pyrolysis of titanium alkoxides and adsorption on $SiO_2$;
c) Adsorption of titanium colloids on $SiO_2$.

These supports are impregnated with metals of the Pt group, in the case of palladium with $PdCl_2$. The metal-support interactions (SMSI) are examined in the total oxidation of acetone. In these studies, it was found that only the catalyst produced by method a) is active. This makes it clear that the properties and the catalytic activity of the modified supported catalysts are influenced by the method by which they are produced.

It is an object of the present invention to provide a catalyst and a process for producing this catalyst, which catalyst has the active component highly dispersed, has a high sintering and agglomeration stability and is superior to the catalysts described in the prior art, especially for use in the hydrogenation of unsaturated compounds.

We have found that this object is achieved by a supported catalyst comprising a catalytically active metal and a support modified by application of modifiers to an inner support material. The catalyst of the invention is produced by applying the catalytically active metal in the form of its chloride-free dissolved amine complexes, acetylacetonate complexes or allyl complexes to the modified support.

In the supported catalysts of the present invention, the catalytically active metal is dispersed particularly finely and in a particularly stable fashion. Avoiding the use of chloride ions prevents adverse effects of the chloride ions on the dispersion and activity of the catalytically active metal.

For the purposes of the present invention, modifiers are components which are applied to supports and influence the activity and selectivity of the catalyst.

For the purposes of the present invention, an inner support material is the support component still to be modified. The support is composed of inner support material and modifier.

The inner support material is preferably pretreated thermally prior to application of the modifiers. The modification of the inner support material by the modifier is based on the hypothesis that a hydrolysis-sensitive modifier compound (the modifier precursor) added in excess to the inner support material reacts with the surface hydroxyl groups of the inner support material. The number of surface groups available for this can be controlled, according to E. F. Vansant, P. Van der Voort and K. C. Vrancken "Studies in Surface Science and Catalysis", Vol. 93, Chapter 4, pages 79 to 88, Editors: B. Delmon and J. T. Yates, Elsevier, 1995 and Ralph K. Iler "The Chemistry of Silica", pages 624 to 637, John Wiley & Sons, 1979, for the example of $SiO_2$, by thermal pretreatment of the inner support material. The thermal pretreatment of the inner support material accordingly has a decisive influence on the properties of the catalyst.

The inner support material used is preferably a material selected from the group consisting of $Al_2O_3$, $SiO_2$, $TiO_2$, $ZrO_2$, aluminosilicates, MgO and activated carbon which has been chemically modified by surface oxidation. Particular preference is given to using $SiO_2$ as inner support material.

The support material can be present in any form. Preference is given to powder, granules, extrudates, spheres, pellets or rings.

As modifier precursor, use is made of compounds comprising a metal of transition group IV, V, VI or VIII of the Periodic Table of the Elements. The modifier preferably comprises an element selected from the group consisting of Ti, Zr, Hf, V, Nb, Cr, Mo, W, Mn, Ta. Particular preference is given to using compounds of Ti, Zr, Nb, Ta as modifier.

The future modifiers are generally applied in the form (the precursor form) of their alkoxides, halides, oxalates or carboxylates. They are preferably applied in the form of their alkoxides. These should be hydrolysis-sensitive so that they can be converted into their oxides. Compounds selected from the group consisting of titanium tetraisopropoxide, titanium tetrachloride, zirconium bromide, zirconium isopropoxide, niobium(V) ethoxide, niobium(V) isopropoxide, niobium oxalate, niobium ammonium oxalate, tantalum chloride and tantalum ethoxide are particularly preferably used. Very particular preference is given to using titanium tetraisopropoxide and niobium(V) isopropoxide.

The modifiers interact with a catalytically active metal applied to the catalyst support, thus giving catalysts having an increased activity since the dispersion of the active species is increased compared to catalysts without modifiers. Furthermore, such modified supported catalysts have a better ageing stability owing to their increased agglomeration and sintering resistance.

As catalytically active metals, use is made of metals of groups I, VII and VIII of the Periodic Table of the Elements, preferably Co, Rh, Ni, Pd, Pt, Re, Cu or Ag. Particular preference is given to using Ni, Co, Pd, Pt and very particular preference is given to using Pd and Pt. Pd is most preferred.

The catalytically active metals are applied in the form of their chloride-free amine complexes, acetylacetonate complexes or allyl complexes, preferably in the form of their amine complexes. The counterions used are generally nitrate or hydroxide. Pd is particularly preferably applied in the form of $[Pd(NH_3)_4](NO_3)_2$ and Pt is particularly preferably applied in the form of $[Pt(NH_3)_4](NO_3)_2$.

The catalytically active metal can be distributed over the shaped body in any way. It is preferably present as a coating (shell) having a thickness of up to 2 mm, particularly preferably a thickness of up to 1 mm.

The present invention further provides a process for producing a catalyst according to the present invention, which comprises the following steps:

a) thermal pretreatment of the inner support material, b) impregnation of the thermally pretreated inner support material with a modifier in the gas or liquid phase, c) if desired, hydrolysis of the modified support material at from 20 to 200° C. in an $H_2O$-containing gas stream, d) if desired, drying at from 100 to 500° C., e) if desired, calcination at from 200 to 1000° C., f) application of the catalytically active metal by impregnation or ion exchange, g) drying at from 20 to 500° C., h) if desired, calcination at up to 1000° C.

The thermal pretreatment of the inner support material (support oxide) enables the number of available surface hydroxyl groups to be controlled. These react with the modifier precursor. The thermal pretreatment can be carried out in air or in a stream of nitrogen, generally at from 200 to 1200° C., preferably from 400 to 800° C. For example, the inner support material is, in the case of $SiO_2$ granules, pretreated at from 720 to 870 K for from 6 to 8 hours prior to loading with the modifier precursor.

Essentially two routes can be distinguished for applying the modifier precursor to the inner support material. These are, on the one hand, methods of coprecipitation and cocrystallization of the various components (route 1), often via the formation of a gel as intermediate. This results in materials which have a bulk composition which is very similar to the composition of the surface. In contrast, it is also possible to apply substances to the surface of existing support materials (route 2) by, for example, exploiting adsorption properties, ion exchange capability or the possibility of forming chemical bonds between the support material and the component applied. The milling of solid pure materials and subsequent thermal treatment, which sometimes make solid state reactions between the components possible, can be considered as intermediate routes between the two principal methods distinguished above.

Preference is given to using the second route in the process of the present invention for producing the supported catalysts of the present invention. For this purpose, an impregnation of the inner support material is carried out in the liquid phase in a suitable solvent or in the gas phase.

Impregnation in the gas phase can be carried out, for example, by chemical vapor deposition (CVD). A suitable modifier precursor is, for example, $TiCl_4$ which can be reacted with oxidic surfaces from the gas phase.

Impregnation in the liquid phase can be carried out from an aqueous or organic phase, depending on the modifier precursors used. The preferred metal alkoxide-modified supports are produced by impregnation of the desired inner support material with a solution of an alkoxide precursor of the desired metal oxide. Here, the solution used for the impregnation is preferably organic. The only proviso is that an adequate amount of the modifier precursor of the metal oxide chosen is soluble in the solvent. For the present purposes, an adequate amount generally means from 1 mol of modifier metal per 0.1–100 kg of inner support material, preferably per 1–50 kg of inner support material, particularly preferably per 5–25 kg of inner support material. Use is usually made of hydrocarbons or alcohol solvents, preferably tetrahydrofuran. The modified support material is, if desired, hydrolyzed in an $H_2O$-containing gas stream at from 20 to 200° C., preferably from 20 to 100° C. This stream is, for example, an $H_2O$-containing inert gas such as $N_2$ or Ar or $H_2O$-containing air or $H_2O$-containing oxygen. Subsequently, the modified support material is, if desired, dried at from 80 to 500° C., preferably from 100 to 200° C., and, if desired, calcined at from 200 to 1000° C., preferably from 400 to 800° C. The calcination step is preferably omitted.

The resulting proportion of modifier oxide, based on the inner support material, is generally from 0.1 to 10% by weight, preferably from 0.5 to 5% by weight, particularly preferably from 1 to 3% by weight. If the modified support material is not hydrolyzed or not dried or not calcined, the modifier precursor can also be the desired target product of the first step.

The application of the catalytically active metal can be carried out by methods known from the literature, preferably by impregnation with the active components in the liquid phase, i.e. preferably by impregnation or ion-exchange processes. A review of the use of these two methods is given by Doorling et al. (T. A. Doorling, B. W. Lynch, L. Moss, J. Catal. 20 (1971), 190) for the example of the system $Pt/SiO_2$. Important parameters in the application of the noble metals (active components) which influence the future dispersion of the active component are the pH of the aqueous impregnation solutions and the nature of the precursor of the active component. Sulfur-containing ions present can likewise have effects on the dispersion of the metal. Depending on the precursor compound used to introduce the catalytically active metal (active component), the impregnation can be carried out in aqueous or organic solution. If the catalytically active metal used is palladium, as is particularly preferred in the catalysts of the present invention, ion-exchange processes are preferably carried out using $Pd(NH_3)_4(NO_3)_2$ in ammoniacal, aqueous solution and impregnation processes are preferably carried out using diallylpalladium or palladium acetylacetonate in organic solution. As organic solvent, preference is here given to using alcohols or THF. Particular preference is given to using chloride-free palladium precursor compounds.

Subsequent to the impregnation, the supported catalyst obtained is dried at from 20 to 500° C., preferably from 50 to 300° C., particularly preferably from 100 to 250° C., and, if desired, calcined at up to 1000° C. The calcination step is preferably omitted.

The novel supported catalysts produced in this way generally contain from 0.01 to 1.5% by weight of Pd, preferably from 0.1 to 1.4% by weight of Pd, based on the total mass of the supported catalyst.

The dispersion of the Pd, measured by a method described by Th. Mang, Präparation, Charakterisierung und Aktivität von Palladiumkatalysatoren mit Konzentrationsprofil, thesis, Munich, 1996, by pulse chemisorption of CO in a stream of hydrogen, is dependent on the application of the catalytically active metal (impregnation/ion-exchange processes) and the precursor compound used. The dispersion of Pd (reported in %) on a modified support is usually higher than that on an unmodified support, as the examples below for the system $SiO_2$—$TiO_2/SiO_2$ show. In the catalysts produced by ion exchange or impregnation of $TiO_2$-modified $SiO_2$ supports using $Pd(NH_3)_4(NO_3)_2$ solutions, Pd dispersions of >50% can be achieved.

An increased dispersion of the catalytically active metal on modified supports compared to unmodified supports is retained even after a number of redox cycles, which makes it clear that the stability of the catalytically active metal particles is increased by the modification of the support.

The present invention further provides for the use of the catalyst of the present invention in a process for the hydrogenation of unsaturated compounds and also provides a process for the hydrogenation of unsaturated compounds in which a catalyst according to the present invention is used.

Examples of unsaturated compounds which can be used in such a process are acetylenes, dienes, olefins, aromatic systems, aldehydes, ketones, for example α,β-unsaturated aldehydes and ketones, and compounds bearing further functional groups, and also combinations thereof. Furthermore, the catalyst of the present invention can be used in a process for removing $O_2$ or $H_2$.

The hydrogenation can be carried out in the gas phase, in the liquid phase or in a mixed gas/liquid phase. The process can be carried out continuously or batchwise.

The process is carried out using known, literature methods for the hydrogenation of unsaturated compounds with the aid of supported catalysts. Reviews of the industrial hydrogenation of unsaturated compounds may be found in "Studies in Surface Science and Catalysis", Vol. 27, Editor: L. erveny, Chapter 18 from M. L. Derrien, p. 613 to 665 and "Ullman's Encyclopedia of Industrial Chemistry", Editors: B. Elvers, S. Hawkins, M. Ravenscroft and G. Schulz, 5th edition, Vol. A13, p. 487 to 497.

The process is generally carried out in a pressure range from 0 to 300 bar, preferably from 0 to 100 bar, particularly preferably from 0 to 50 bar, and in a temperature range from 0 to 400° C., preferably from 0 to 200° C., particularly preferably from 0 to 150° C.

The following examples illustrate the invention.

EXAMPLES

1. Catalyst Production

Production of $SiO_2$ Granules (catalyst A)

Sodium silicate solution was admixed with aqueous $NH_3$ and subsequently precipitated using $H_2SO_4$. The precipitated $SiO_2$ was then isolated in a filter press and washed with water until free of sodium. The filter cake was subsequently slurried and spray dried at from 105 to 150° C. in a spray dryer. The product obtained was then compounded in a Mix-Muller and extruded to form 4 mm extrudates. These were then dried at 120° C. and calcined at 800° C. The calcined extrudates were finally ground to form granules and a 250–500 μm fraction was sieved out. The BET surface area was 193 $m^2/g$.

1.1 Modification of $SiO_2$ 1.1.1 Application of $TiCl_4$ from the Gas Phase (catalyst B)

$SiO_2$ granules (catalyst A) were baked out at 720 K in a stream of nitrogen (about 250 ml/min) for 6 hours. After cooling the $SiO_2$ to 450 K, the stream of nitrogen was passed through a wash bottle containing $TiCl_4$ before passing through the $SiO_2$-filled reactor. To ensure complete reaction of the starting materials, $TiCl_4$ was passed through the oxide in this way for 90 minutes. The reactor was subsequently flushed with dry nitrogen for 30 minutes at the same temperature. In a further step, likewise at 450 K, nitrogen saturated with water vapor was passed through the sample for 120 minutes to hydrolyze the remaining $TiCl_4$ entities. This was followed by drying for 5 hours at 470 K and calcination for 5 hours at 870 K. A $TiO_2$ content of 2.2% by weight was obtained.

1.1.2 Application of $Ti(O^iPr)_4$ (catalyst C)

$SiO_2$ granules (catalyst A) were first pretreated at 870 K in air for 8 hours. Subsequently, 12 g of the sample were baked out at 870 K under reduced pressure. Under a nitrogen atmosphere, 50 ml of THF and 1.2 ml of $Ti(O^iPr)_4$ were added to the cooled material. The suspension was stirred at room temperature for 30 minutes and the oxide was subsequently filtered off. To wash the oxide, it was suspended twice in 40 ml of THF and filtered off each time. The support was first hydrolyzed in air at room temperature and subsequently calcined for 2 hours at 470 K and 5 hours at 870 K. The resulting $TiO_2$ content was 2.2% by weight.

1.2 Application of Palladium to $SiO_2$ and $TiO_2/SiO_2$ using $Pd(NH_3)_4(NO_3)_2$.

The application of palladium as active component to the supports studied was carried out by different methods in order to elucidate effects of the modification of the support. Only chloride-free palladium compounds were used.

1.2.1 Ion Exchange on $SiO_2$ Using $Pd(NH_3)_4(NO_3)_2$ at pH≈9 (catalyst D)

10 g of $SiO_2$ granules (catalyst A) were suspended overnight in 100 ml of 0.01 M $NH_4NO_3$ solution. On the next day, 100 ml of ammonia solution (≈0.05% by weight) were added. After the pH had stabilized, 100 ml of 0.03 M $Pd(NH_3)_4(NO_3)_2$ solution were added. The $Pd(NH_3)_4(NO_3)_2$ solution was additionally 0.01 M in $NH_4NO_3$. After stirring for about 30 minutes, the solid was filtered off and washed twice with 0.01 M $NH_4NO_3$ solution which had been adjusted beforehand to the final pH of the suspension. The support was dried in a desiccator at room temperature and atmospheric pressure. Before the further studies, the catalyst was again dried for 2 hours at 390 K in air. The palladium content was 1.3% by weight.

1.2.2 Ion Exchange on $SiO_2$ Using $Pd(NH_3)_4(NO_3)_2$ at pH≈9 (catalyst E)

10 g of $SiO_2$ granules (catalyst A) were suspended overnight in 165 ml of 0.01 M $NH_4NO_3$ solution. On the next day, 100 ml of ammonia solution (≈0.05% by weight) were added. After the pH had stabilized, 35 ml of 0.03 M $Pd(NH_3)_4(NO_3)_2$ solution were added. The $Pd(NH_3)_4(NO_3)_2$ solution was additionally 0.01 M in $NH_4NO_3$. After stirring for about 30 minutes, the solid was filtered off and washed twice with 0.01 M NH4NO3 solution which had been adjusted beforehand to the final pH of the suspension. The support was dried in a desiccator at room temperature and atmospheric pressure. Before the further studies, the catalyst was again dried for 2 hours at 390 K in air. The palladium content was 0.83% by weight.

1.2.3 Ion Exchange on $TiO_2/SiO_2$ Using $Pd(NH_3)_4(NO_3)_2$ at pH≈9 (catalyst F)

10 g of $TiO_2$-modified $SiO_2$ granules (catalyst C) was suspended overnight in 100 ml of 0.01 M $NH_4NO_3$ solution. On the next day, 100 ml of ammonia solution (0.05% by weight) were added. After the pH had stabilized, 100 ml of 0.03 M $Pd(NH_3)_4(NO3)_2$ solution were added. The $Pd(NH_3)_4(NO_3)_2$ solution was additionally 0.01 M in $NH_4NO_3$. After stirring for about 30 minutes, the solid was filtered off and washed twice with 0.01 M $NH_4NO_3$ solution which had been adjusted beforehand to the final pH of the suspension. The support was dried in a desiccator at room temperature and atmospheric pressure. Before the further studies, the catalyst was again dried for two hours at 390 K in air. The Pd content was 1.4% by weight.

1.2.4 Ion Exchange on $TiO_2/SiO_2$ Using $Pd(NH_3)_4(NO_3)_2$ at pH≈9 (catalyst G)

10 g of $TiO_2$-modified $SiO_2$ granules (catalyst C) was suspended overnight in 165 ml of 0.01 M $NH_4NO_3$ solution. On the next day, 100 ml of ammonia solution (≈0.05% by weight) were added. After the pH had stabilized, 35 ml of 0.03 M $Pd(NH_3)_4(NO_3)_2$ solution were added. The $Pd(NH_3)_4(NO_3)_2$ solution was additionally 0.01 M in $NH_4NO_3$. After stirring for about 30 minutes, the solid was filtered off and washed twice with 0.01 M $NH_4NO_3$ solution which had been adjusted beforehand to the final pH of the suspension. The support was dried in a desiccator at room temperature and atmospheric pressure. Before the further studies, the catalyst was again dried for two hours at 390 K in air. The palladium content was 0.90% by weight.

1.2.5 Impregnation of $SiO_2$ with $Pd(NH_3)_4(NO_3)_2$ at pH≈9 (catalyst H)

4 g of $SiO_2$ granules (catalyst A) were pretreated at 720 K for 1 hour. Subsequently, a solution of 1.07 ml of $Pd(NH_3)_4(NO_3)_2$ solution (4.87% Pd) and 2.93 ml of $NH_3$ solution (0.5% by weight) was added in portions of 1 ml each and the powder was stirred through in between. The samples were closed overnight and subsequently dried for a number of days over silica gel in a desiccator, without evacuation. The material obtained had a palladium content of 1.27% by weight.

1.2.6 Impregnation of $TiO_2/SiO_2$ with $Pd(NH_3)_4(NO_3)_2$ at pH≈9 (catalyst I)

4 g of $TiO_2$-modified $SiO_2$ granules (catalyst C) were pretreated at 720 K for 1 hour. Subsequently, a solution of 1.07 ml of $Pd(NH_3)_4(NO_3)_2$ solution (4.87% Pd) and 2.93 ml of $NH_3$ solution (0.5% by weight) was added in portions of 1 ml each and the powder was stirred through in between. The samples were closed overnight and subsequently dried for a number of days over silica gel in a desiccator, without evacuation. The material obtained had a palladium content of 1.20% by weight.

1.3. Application of Other Palladium Compounds to $SiO_2$ and $TiO_2/SiO_2$ 1.3.1 Impregnation of $SiO_2$ with Palladium Nitrate (catalyst J) (comparative example)

4 g of $SiO_2$ granules (catalyst A) were pretreated at 720 K for 1 hour. Subsequently, 4 ml of a solution of one part of $Pd(NO_3)_2$ solution (11.0% Pd, 18% $HNO_3$) and 9 parts of water were added in portions of 1 ml each and the powder was stirred through in between. The samples were closed overnight and subsequently dried for a number of days over silica gel in a desiccator, without evacuation. Before further studies, the sample was dried for two hours at 390 K. The material obtained had a palladium content of 1.35% by weight.

1.3.2 Impregnation of $TiO_2/SiO_2$ with Palladium Nitrate (catalyst K) (comparative example)

4 g of $TiO_2$-modified $SiO_2$ granules (catalyst C) were pretreated at 720 K for 1 hour. Subsequently, 4 ml of a solution of one part of $Pd(NO_3)_2$ solution (11.0% Pd, 18% $HNO_3$) and 9 parts of water were added in portions of 1 ml each and the powder was stirred through in between. The samples were closed overnight and subsequently dried for a number of days over silica gel in a desiccator, without evacuation. Before further studies, the sample was dried for two hours at 390 K. The material obtained had a palladium content of 1.3% by weight.

1.3.3 Impregnation of $SiO_2$ with Palladium Acetylacetonate (catalyst L)

5 g of $SiO_2$ granules (catalyst A) were baked out at 670 K under reduced pressure for 2.5 hours. A solution of 0.174 g of palladium acetylacetonate and 50 ml of THF was added to the cooled support, the suspension was refluxed for two hours and the solvent was subsequently removed. After drying in air at room temperature, the sample was dried at 390 K in air for a further two hours. A palladium content of 1.15% by weight was found.

1.3.4 Impregnation of $TiO_2/SiO_2$ with Palladium Acetylacetonate (catalyst M)

5 g of $TiO_2$-modified $SiO_2$ granules (catalyst C) were baked out at 670 K under reduced pressure for 2.5 hours. A solution of 0.174 g of palladium acetylacetonate and 50 ml of THF was added to the cooled support, the suspension was refluxed for two hours and the solvent was subsequently removed. After drying in air at room temperature, the sample was dried at 390 K in air for a further two hours. A palladium content of 1.05% by weight was found.

2. Catalyst Stability 2.1 Dispersion Measurement by Means of CO Pulse Chemisorption The dispersion measurements were carried out as described by Th. Mang (Th. Mang, Präparation, Charakterisierung und Aktivität von PalladiumKatalysatoren mit Konzentrationsprofil, thesis, Munich, 1996) by means of pulse chemisorption of CO in a stream of hydrogen. Pulses of a known amount of CO are added to the stream of hydrogen flowing through the catalyst sample. A thermal conductivity detector is used to measure the amount of CO which flows through the reactor without being (irreversibly) adsorbed on the sample. The dispersion is defined as the molar ratio of the amount of CO which is taken up to the amount of palladium present in the sample. This is based on the assumption that one CO molecule is bound to each surface palladium atom.

The samples to be measured were reduced in 25 ml of $H_2$/min at 420 K for one hour. After the samples had cooled to room temperature, pulses of 75 μl of CO were passed over them in a stream of hydrogen of likewise 25 ml/min.

Palladium dispersions measured:

| Catalyst | Pd dispersion [%] (support SiO$_2$) | Catalyst | Pd dispersion [%] (support TiO$_2$/SiO$_2$) |
|---|---|---|---|
| D | 47 | E | 53 |
| E | 24 | G | 51 |
| H | 34 | I | 53 |
| J | 27 | K | 25 |
| L | 16 | M | 21 |

The measurements unambiguously show that the catalysts produced from TiO$_2$-modified SiO$_2$ samples by ion exchange using [Pd(NH$_3$)$_4$](NO$_3$)$_2$ solution (catalysts D/F, E/G) or impregnation (catalysts H/I) with Pd(NH$_3$)$_4$(NO$_3$) solution have the Pd significantly more highly dispersed than do the corresponding comparative SiO$_2$ samples. Even after impregnation with palladium acetylacetonate solution (catalysts L/M), the Pd dispersion achieved in the TiO$_2$-modified samples is significantly higher. However, on impregnation with Pd(NO$_3$)$_2$ solution (catalysts J/K), a reduction in the dispersion is observed.

2.2 Redox Cycles

In order to obtain further information on the samples, the samples were, after the measurement, calcined at 720 K for 30 minutes to simulate a regeneration step and after they had again been reduced in a stream of hydrogen for 1 hour at 340 K, the uptake of CO was measured again. This step was repeated once more so that each sample was measured a total of three times. This enabled statements about the development of the sample to be made, without giving the absolute values from the dispersion measurement undue importance.

Palladium dispersions measured:

| Catalyst | Pd dispersion [%] | | |
|---|---|---|---|
| | after 1$^{st}$ reduction | after 2$^{nd}$ reduction | after 3$^{rd}$ reduction |
| D | 47 | 29 | 26 |
| F | 53 | 35 | 31 |
| E | 24 | 17 | 17 |
| G | 51 | 36 | 31 |
| H | 34 | 21 | 22 |
| I | 53 | 28 | 25 |
| J | 27 | 29 | 28 |
| K | 25 | 19 | 16 |
| L | 16 | 25 | 24 |
| M | 21 | 44 | 42 |

The measurements unambiguously show that the catalysts produced from TiO$_2$-modified SiO$_2$ samples by ion exchange using [Pd(NH$_3$)$_4$](NO$_3$)$_2$ solution (catalysts D/F, E/G) or impregnation (catalysts H/I) with Pd(NH$_3$)$_4$(NO$_3$)$_2$ solution have a significantly higher dispersion of Pd even after multiple oxidation and reduction. The stability of the Pd particles is significantly increased by the modification with TiO$_2$.

In contrast, the catalysts J/K impregnated with Pd(NO$_3$)$_2$ solution display a lower degree of dispersion, after a plurality of redox cycles too. The best results were able to be achieved using TiO$_2$-modified systems in which the active metal was applied by means of [Pd(NH$_3$)$_4$](NO$_3$)$_2$ solution.

We claim:

1. A process for producing a supported catalyst comprising at least one active metal selected from the group of Pt and Pd, and a SiO$_2$ support which comprises a modifier which comprises Ti, which process comprises the following steps:

a) thermally pretreating a SiO$_2$ support material,
   b) impregnating the thermally pretreated SiO$_2$ support material in an organic solvent with titanium tetraisopropoxide,
   c) optionally hydrolyzing the modified support material at from 20 to 200° C. in O$_2$ or in air or in an H$_2$O-containing gas stream,
   d) optionally drying the hydrolyzed material of step c) at from 100 to 500° C.,
   e) optionally calcining the dried material of step d) at from 200 to 1000° C.,
   f) applying the active metal by impregnation or by ion exchange to obtain the supported catalyst, wherein the active metal is applied using a solution of [Pd(NH$_3$)$_4$](NO$_3$)$_2$ and/or a solution of [Pt(NH$_3$)$_4$](NO$_3$)$_2$,
   g) drying the supported catalyst at from 20 to 500° C., and
   h) optionally calcining the dried supported catalyst at up to 1000° C.

2. The process of claim 1, wherein step h) is omitted.

3. The process of claim 1, wherein the calcination in step e) is carried out at from 400 to 800° C.

4. The process of claim 1, wherein step e) is omitted.

5. The process of claim 1, wherein the organic solvent in step b) is tetrahydrofuran.

6. The process of claim 1, wherein the active metal is Pd which is applied using [Pd(NH$_3$)$_4$](NO$_3$)$_2$.

7. The process of claim 1, wherein step f) is conducted at a pH of about 9.

8. The process of claim 1, wherein the calcining steps e) and h) are omitted.

9. The process of claim 1, wherein an amount of 1 mol of the titanium tetraisopropoxide is applied per 1 to 50 kg of the SiO$_2$ support material.

10. The process of claim 1, wherein an amount of 1 mol of the titanium tetraisopropoxide is applied per 5 to 25 kg of the SiO$_2$ support material.

11. The process of claim 1, wherein the active metal is applied by ion-exchange in an ammoniacal aqueous solution.

12. The process of claim 11, wherein the active metal is Pd which is applied using [Pd(NH$_3$)$_4$](NO$_3$)$_2$.

* * * * *